Oct. 10, 1950  T. R. TAYLOR  2,524,941
DEVICE FOR PRODUCING MARGINED PHOTOGRAPHS
Filed Dec. 3, 1945
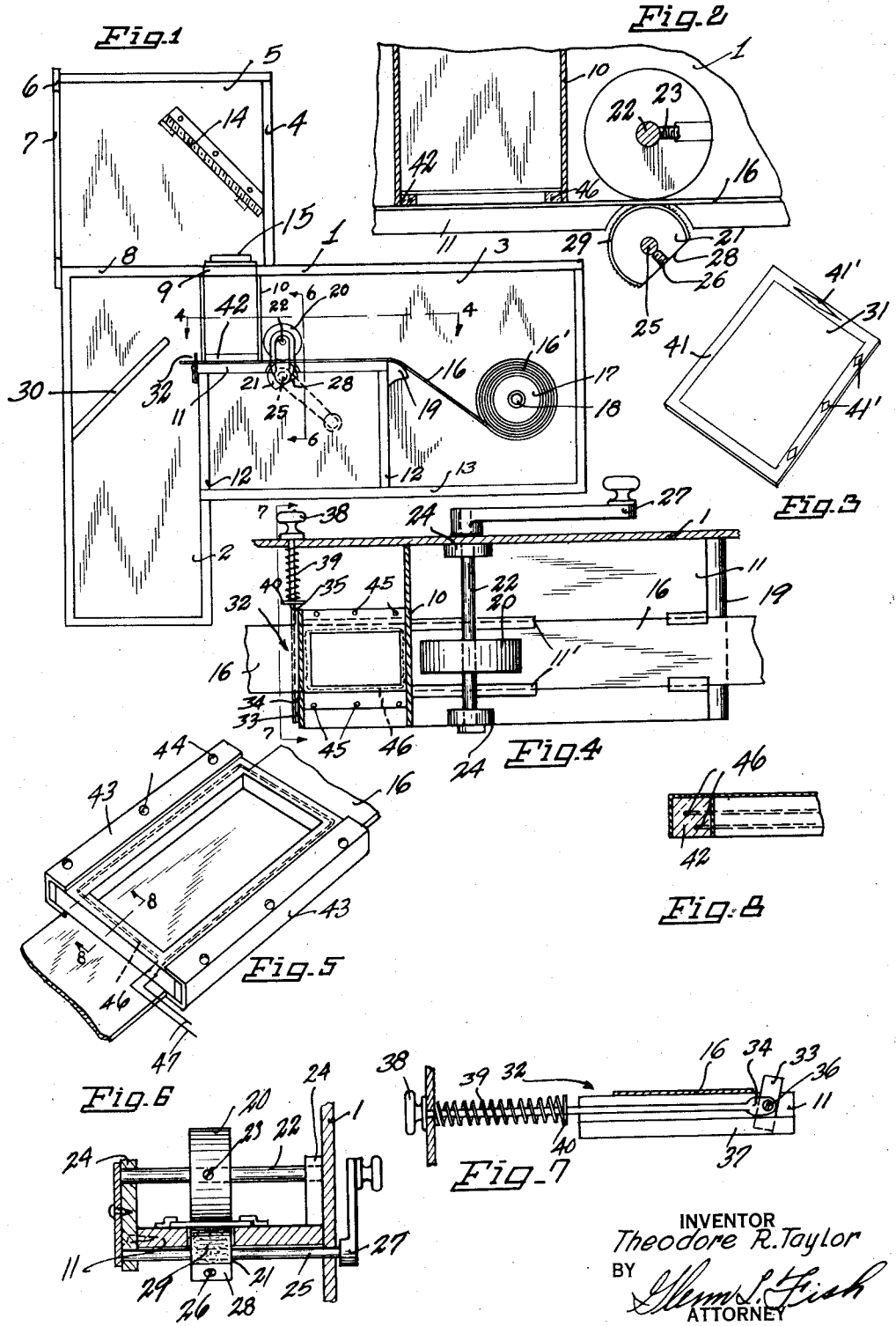
INVENTOR
Theodore R. Taylor
BY
ATTORNEY Patented Oct. 10, 1950

2,524,941

UNITED STATES PATENT OFFICE 2,524,941

DEVICE FOR PRODUCING MARGINED PHOTOGRAPHS

Theodore R. Taylor, Spokane, Wash.

Application December 3, 1945, Serial No. 632,415

1 Claim. (Cl. 95—77)

This invention relates to cameras and it is one object of the invention to provide a camera by means of which pictures may be taken and produced directly upon photographic paper instead of upon film which must be developed before a picture may be printed from the film.

Another object of the invention is to provide a camera wherein a strip of photographic paper is moved intermittently across a table and through the lower end of a tube rising from the table and having a lens at its upper end through which an image is directed from a mirror in a chamber or compartment into which the upper end of the tube extends.

Another object of the invention is to provide a camera having means for moving the strip of photographic paper so constructed that when a handle of a shaft is turned and a roller turned with the shaft the paper will be intermittently shifted longitudinally and brought to a full stop between such movement so that during these intervals pictures may be taken and developed directly upon the paper. It will thus be seen that a number of pictures may be taken in quick succession and a number of pictures of a person in different poses obtained in a short space of time.

Another object of the invention is to provide a camera having therein means for severing the strip transversely between pictures which have been taken, the cutting means being adapted to be operated without opening the camera and thus eliminating danger of spoiling sensitized photographic paper when cutting the paper between the pictures.

Another object of the invention is to provide the camera with a frame under which the paper moves as it passes through the lens-carrying tube, the frame being so formed that when a picture is taken upon a portion of the paper covered by the frame the picture will form a border for the picture.

Another object of the invention is to provide a camera having in its main compartment or chamber a table for supporting the paper and the means for moving the paper, there being upon the table tracks for guiding the paper towards the feeding means and also through the lower end of the tube where it rests upon the frame while a picture is being taken.

Another object of the invention is to provide a camera for taking pictures directly upon photographic paper which is simple in construction and very compact.

The invention is illustrated in the accompanying drawings wherein:

Fig. 1 is a side view of the improved camera, the side wall being removed in order to disclose mechanism in the housing or casing of the camera.

Fig. 2 is a fragmentary view showing the mechanism for feeding photographic paper along the table of the camera.

Fig. 3 is a perspective view of a picture taken with the camera.

Fig. 4 is a view taken along the line 4—4 of Figure 1.

Fig. 5 is a perspective view of the frame under which the paper is disposed while a picture is being taken.

Fig. 6 is a fragmentary sectional view taken along the line 6—6 of Figure 1.

Fig. 7 is a view showing the means for cutting the paper into sections after pictures have been taken.

Fig. 8 is a sectional view taken through the paper-covering frame along the line 8—8 of Figure 5.

This improved camera has a housing or casing 1 which may be formed of any suitable material and at its front end is extended downwardly to form a well 2 located at an end of the main chamber or compartment 3 of the housing. Above the forward end portion of the housing is an auxiliary casing 4 defining an auxiliary chamber 5, and this casing 4 has its front wall 6 formed with an opening 7 for entry of an image into the auxiliary chamber 5. A portion of the upper wall of the main casing or housing forms a bottom 8 for the auxiliary casing 4 and through this bottom is formed an opening 9 to receive the upper end of a tube 10 which rests upon a table 11 disposed in the main chamber 3 and having its legs 12 resting upon the bottom 13 of the main casing 1. Within the auxiliary chamber 5 is mounted a mirror 14 which is disposed over the lens 15 at the upper end of the tube 10 and since this mirror is opposite the image inlet opening 7 and mounted diagonally at an angle of 45° an image of a person or object to be photographed will be reflected downwardly through the lens and the tube. Therefore when a portion of a strip of sensitized photographic paper 16 is in position across the bottom of the tube a reproduction of the image will be produced on the paper and a picture thus taken directly on the paper instead of an exposure upon a film which must be developed and pictures printed from the film.

The photographic paper is supplied by the manufacturer in a roll 16′ which is wound upon a spool 17, and this spool is rotatably mounted in the main chamber upon a pin or spindle 18 extending transversely of the chamber 3 in such relation to an end of the table that the strip of paper may be unwound from the roll and extended along the table and through the lower end of the tube. A guide 19 is provided at an end of the table so that the paper will move into place upon the table without being creased or otherwise damaged by contact with the edge of the table.

The strip of paper is to be intermittently fed along the table between guides 11' and through the lower end of the tube with appreciable intervals of time between its movements and in order to do so there has been provided feeding mechanism having upper and lower rollers 20 and 21. The upper roller 20 constitutes a pressure roller and is secured upon a shaft 22 by a set screw 23, the shaft being rotatably mounted through bearing brackets 24 rising from the table adjacent side edges thereof. The lower roller 20 which is a feed roller, is secured upon a shaft 25 by a set screw 26, and upon referring to Figure 6 it will be seen that the shaft 25 has one end rotatably supported by the lower end portion of one bracket 24 and its other end portion rotatably mounted through a wall of the housing or casing 1 with an end protruding from the housing and carrying a crank 27 by means of which it is turned. The roller 21 is formed with a flat face 28 so that during rotation of the lower roller it will, for a portion of its rotation, be out of contact with the under face of the strip of paper and no movement imparted to the paper during this period of time. A sheet of sandpaper 29 is mounted against the arcuate portion of the edge face of the roller with its ends terminating at ends of the flat face and cause the roller to frictionally grip the under face of the paper strip and move the paper longitudinally when the roller is turned. As soon as the roller 21 moves out of engagement with the paper strip movement of the paper will stop and a picture will be taken while the paper remains stationary.

After a picture has been taken the crank is turned to rotate the lower roller and move the portion of the paper strip bearing the picture out of the tube and this portion of the paper strip is cut from the strip to provide a picture which drops into the well 2, a deflector 30 being provided in the upper portion of the well for guiding the pictures downwardly into the well as they are cut from the paper strip. One of the pictures is shown in Figure 3 and designated by the numeral 31. The paper is cut after pictures are taken and the end portion of the paper bearing a picture moved out of the tube by cutting mechanism 32 constructed as shown in Figures 4 and 7.

This cutting mechanism has a blade 33 secured to the flattened end 34 of a rod 35 by a fastener 36 and the lower end portion of the blade is engaged with a guide plate or strip 37 mounted against the edge face of the table 11. The rod 35 projects from the table and outwardly through an opening formed in a disc wall of the housing 1 and at its outer end carries a knob 38 by means of which it may be readily pulled outwardly in opposition to action of a spring 39 coiled about the rod with one end abutting the wall of the housing and its other end bearing against a washer 40 mounted upon the rod. As the rod is drawn outwardly the blade will cut the picture 31 from the strip and when the knob 38 is released the spring returns the rod and the blade to the normal position shown in Figure 7.

When a picture is taken it is desired to form a border 41 about its margins and in order to do so there has been provided a frame 42 formed of glass. This frame has its side portions engaged in strips of channel metal 43 which are U-shaped in cross section and through these metal strips are formed openings 44 to receive fasteners 45 by means of which the strips of metal are secured upon the table. Since portions of the metal strips 43 are under side portions of the glass frame, the frame will be spaced upwardly from the table and the strip of paper may be disposed between the frame and the table and be slid longitudinally without binding. A filament 46 is embedded in the glass frame and extends about the frame with its ends protruding therefrom and connected with wires 47 so that when a switch is closed current will be supplied to the filament to illuminate the same and create light which passes through the glass frame. Since the filament is energized for only a very short time (1/25 of a second) the heat created is infinitesimal and not sufficient to melt or crack the glass from which the frame is made. The upper face and side faces of the frame are coated with black shellac or other suitable material so that light from the filament will be prevented from passing from the frame except through the under face of the frame. This light will cause the picture to be formed with a white border and if so desired figures or other characters may be painted upon the lower face of the frame so that passage of light at these points will be stopped and the border 41 provided with ornamental markings 41'.

Having thus described the invention, what is claimed is:

A device for forming borders about spaced sections of a strip of photographic paper intermittently fed longitudinally into position for successive exposure of the said sections, said device comprising an open frame formed of transparent material and consisting solely of side bars rectangular in cross section and end bars, and a filament embedded in the side bars and end bars of the frame and extending longitudinally therein about the frame, said frame having the upper faces and side faces of its bars covered with opaque material to prevent passage of light from the frame except through the lower faces of its bars and thereby cause the light to be discharged only downwardly from the frame on to portions of the paper strips located directly under the side and end bars of the frame and form a border surrounding the portion of the paper strip exposed through the open frame.

THEODORE R. TAYLOR.

REFERENCES CITED

The following references are of record in the file of this patent:

UNITED STATES PATENTS

| Number | Name | Date |
| --- | --- | --- |
| 1,335,728 | Folmer | Apr. 6, 1920 |
| 1,795,050 | Simjian | Mar. 3, 1931 |
| 1,867,100 | Roehrich | July 12, 1932 |
| 1,963,095 | Petit et al. | June 19, 1934 |
| 2,043,539 | Harrison et al. | June 9, 1936 |
| 2,125,388 | Monroe | Aug. 2, 1938 |
| 2,162,723 | Karnes | June 20, 1939 |
| 2,293,195 | Cohen | Aug. 18, 1942 |
| 2,355,779 | Burleigh | Aug. 15, 1944 |